United States Patent [19]

Sauber

[11] Patent Number: 4,909,134

[45] Date of Patent: Mar. 20, 1990

[54] VENTILATION DEVICE FOR VEHICLE BODIES

[76] Inventor: Charles J. Sauber, 10 N. Sauber Rd., Virgil, Ill. 60182

[21] Appl. No.: 337,490

[22] Filed: Apr. 13, 1989

[51] Int. Cl.⁴ .............................................. B60H 1/26
[52] U.S. Cl. .............................................. 98/2; 98/6; 98/13
[58] Field of Search ............... 98/1, 2, 2.14, 2.18, 98/6, 8, 13, 19, 51, 52, 55, 64, 37

[56] References Cited

U.S. PATENT DOCUMENTS

| | | | |
|---|---|---|---|
| 2,119,905 | 6/1938 | Crawford | 98/13 X |
| 2,223,709 | 12/1940 | Wickstrom et al. | 98/2.18 |
| 2,664,609 | 7/1953 | Fuss | 98/37 X |
| 3,012,812 | 12/1961 | Miller, Jr. | 98/2.18 |
| 3,159,090 | 12/1964 | Schutt | 98/37 X |
| 4,741,256 | 5/1988 | Huang | 98/2.14 |

Primary Examiner—Harold Joyce

[57] ABSTRACT

A ventilator device for use with a vehicle body wall having an air passage opening, the device being a unitary formed hollow structure of flexible elastomeric material that has diametrically opposite facing hoods of generally hopper shapes, has inlet and outlet ends and an intermediate portion which is smaller than the adjacent peripheral parts of the inlet and outlet hoods and corresponds substantially to the peripheral shape of the air passage opening such that the ventilator device may be deformably inserted into the wall opening and positively held in the opening by the peripheral parts of the inlet and outlet hood portions in their normal and undeformed conditions.

5 Claims, 1 Drawing Sheet

U.S. Patent    Mar. 20, 1990    4,909,134

VENTILATION DEVICE FOR VEHICLE BODIES

FIELD OF THE INVENTION

This invention relates generally to vehicle compartment vents, and more particularly concerns ventilator devices for utility bodies of vehicles to allow for air flow into and out of the closed bodies.

BACKGROUND OF THE INVENTION

It is often desirable to provide some type of venting for air circulation in a vehicle body having a closed compartment. Typical approaches that have been followed for molded fiberglass utility bodies have included providing perforations, slots, openings with grates and integrally molded cowling arrangements. In order to protect against the entry of water through any openings provided for air flow, typically some type of hood like fixture, baffle or flap has been affixed to the outside body wall surrounding the openings. Generally, these fixtures are costly and somewhat labor intensive for installation and even more so when replacement is required since it is usually necessary to manually remove an original fitting and then install a replacement using some type of fastener arrangement.

OBJECTS AND SUMMARY OF THE INVENTION

It is, therefore, a primary object of the present invention to provide an improved venilator device for vehicle utility bodies that is relatively simple, low cost in production and permits easy installation and removal for replacement with great facility.

A further object of the invention is to provide an improved ventilator device of the type described above which can be economically manufactured at high production rates.

It is yet another object of one particular aspect of this invention to provide such an improved ventilator device which is self resistant to damage or breakage when struck by objects in use and is less likely to compound damage to the vehicle body when it should happen to be struck by an object.

Other objects and advantages of the invention will become apparent from the following detailed description taken in conjunction with the accompanying drawings.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
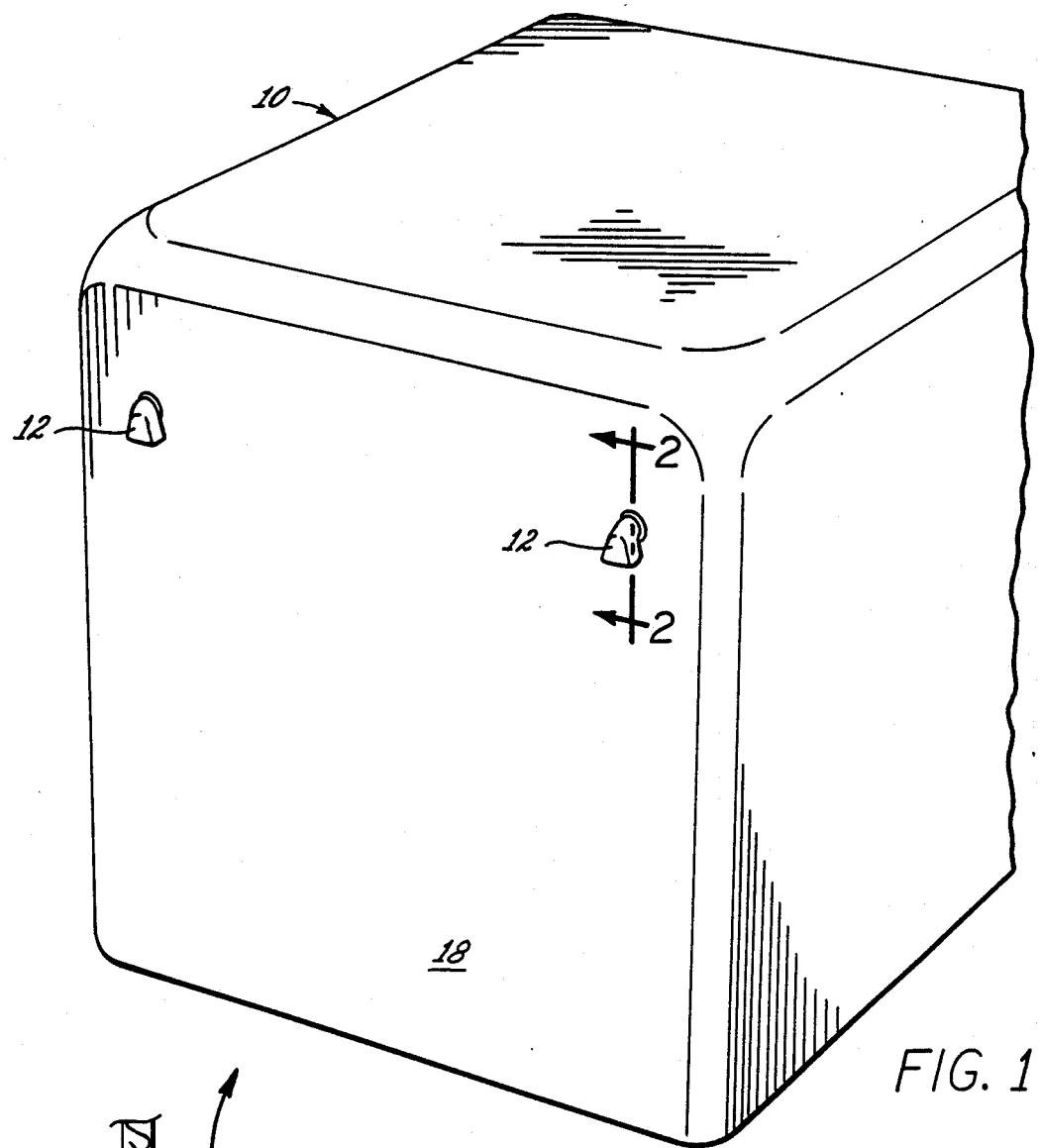
FIG. 1 is a fragmentary perspective view of a vehicle utility body utilizing ventilator devices in accordance with the present invention.
Figure 2:
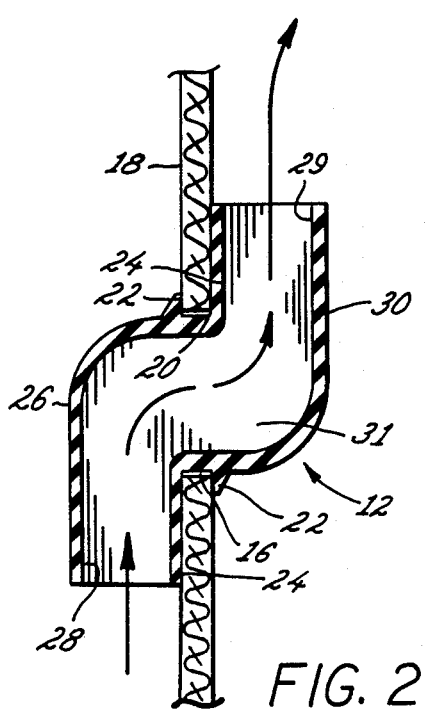
FIG. 2 is an enlarged cross section of a ventilator device shown in and taken along the line of 2—2 in FIG. 1.
Figure 3:
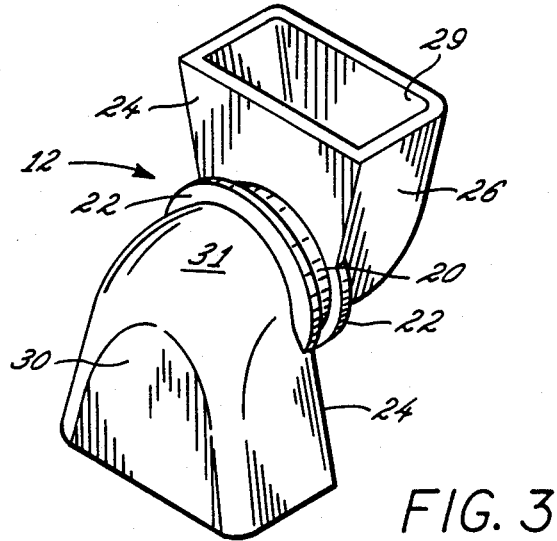
FIG. 3 is a perspective view of a ventilator device shown in FIG. 1.

Turning to the drawings, there is shown in FIG. 1 an exemplary vehicle utility body generally indicated at 10, which may be of the type constructed from molded fiberglass and wherein a pair of ventilator devices 12 of the subject invention are installed on the front wall of the utility body. As best shown by reference to FIGS. 2 and 3, conjointly, the ventilator device 12 is a hollow unitary construction and formed of an elastomeric material such as rubber or a soft deformable plastic. The construction of the ventilator device is such that it may be easily installed simply by deformation and insertion in a circular opening 16 formed in the side wall 18 of the vehicle body. The structure includes a grommet-like circular portion 20 having a length approximately the thickness of the body wall. In order to retain the device in the wall opening, enlarged portions on the outside and inside are formed in part by semicircular flanges 22 and the inward walls 24 of outer and inner hopper shaped hoods 26.

In the present instance, the hoods 26 each have rectangular shaped outer openings 28, 29 and side walls 30 which merge to a central circular shaped elbow center portion 31 with the hood openings 28, 29 facing in diametrically opposite directions.

While the structure of the ventilator device of the present invention is symmetrical and could be positioned with the outer hood openings facing in any clock like position of rotation, it is preferred that the outer hood opening 28 be positioned downward at the 6 o'clock position at least when mounted on the front wall of a vehicle utility body. With this arrangement and the particular configuration having the diametrically opposite facing inside hood opening 29 facing up, air flow into the vehicle body compartment as the vehicle moves or even as wind may blow will be as shown by the arrows in FIG. 2. In rain or snow conditions, or water splashing up from a road, the water will be trapped and drained back down and out for the most part.

Since the ventilator device is one piece and very resilient, it is not apt to be broken or cause damage to the utility body if struck by a rigid object and it is likewise not apt to injure a person or damage clothing of a person who contacts the projecting outside hood of the device. It will be appreciated that the ventilator device of the present invention can be produced in large volumes at low cost and it is easily installed and replaced should it deteriorate or be knocked out by a object striking the device. Furthermore, the ventilator device of the present invention is self-holding in place and does not require any fastening devices such as screws or bolts for installation.

I claim:

1. A ventilator device for use with a vehicle body having an air entry opening therein comprising:
    a unitarily formed hollow structure of flexible elastomeric material including an inlet end portion, an outlet end portion and an intermediate portion having an outer periphery smaller than the adjacent peripheral parts of the inlet and outlet portions, said intermediate portion corresponding substantially to the periphery of said body wall air passage opening, the inlet end portion and the outlet end portion each being in the form of a right angle hood of generally hopper shape, said right angle hoods being symmetrical and having diametrically opposite facing inlet and outlet openings, and said ventilator device being adapted to be deformably inserted into the body wall air passage opening and positively held in the opening by the peripheral parts of said inlet and outlet portions in their normal undeformed conditions.

2. A ventilator device as claimed in claim 1 wherein said hopper shaped right angle hoods have generally rectangular end openings.

3. A ventilator device as claimed in any of claims 1 or 2 wherein the elastomeric material is rubber.

4. A ventilator device as claimed in any of claims 1 or 2 wherein the elastomeric material is soft plastic.

5. A ventilator device as claimed in claim 1 wherein the vehicle body wall air passage opening and the intermediate peripheral portion are circular in shape.

* * * * *